United States Patent [19]
Milling

[11] 3,873,938
[45] Mar. 25, 1975

[54] VERY HIGH POWER SHOCK WAVE GAS LASER

[75] Inventor: Robert W. Milling, Dayton, Ohio

[73] Assignee: The United States of America as represented by the Secretary of the Air Force, Washington, D.C.

[22] Filed: Apr. 16, 1973

[21] Appl. No.: 351,120

[52] U.S. Cl. .................................. 331/94.5, 330/4.3
[51] Int. Cl. ........ H01s 1/06, H01s 3/02, H01s 3/09
[58] Field of Search ..... 330/4.3; 331/94.5 P, 94.5 R

[56] References Cited
UNITED STATES PATENTS

| 3,451,008 | 6/1969 | Dunne | 331/94.5 R |
| 3,564,453 | 5/1967 | Wieder | 331/94.5 P |
| 3,713,030 | 1/1973 | Rantrowitz et al. | 331/94.5 P |
| 3,715,596 | 2/1973 | De Ment | 331/94.5 P |
| 3,760,293 | 9/1973 | Pilloff et al. | 330/4.3 |
| R26,420 | 7/1968 | Wanlass | 331/94.5 P |

OTHER PUBLICATIONS
Laderman et al., "Shock Tube Pumping of Laser Crystals," 8/69, pg. 1743–1745, Applied Optics, Vol. 8, Number 8.

*Primary Examiner*—Maynard R. Wilbur
*Assistant Examiner*—N. Moskowitz
*Attorney, Agent, or Firm*—Harry A. Herbert, Jr.; George Fine

[57] ABSTRACT

A very high power shock wave gas laser including a steel tube separated by a primary frangible diaphragm to provide first and second chambers. At one end of the steel tube there is positioned a spherical mirror and at the other end a secondary diaphragm in combination with a perforated plane mirror. The first chamber is pressurized with an appropriate gas to the point that the primary frangible diaphragm is ruptured. A shock wave generated by the rupture travels into the second chamber and ionizes a preselected gas mixture disposed therein. Stimulated emission and amplification in the second chamber is brought out by way of the perforated mirror upon rupture of the secondary diaphragm.

7 Claims, 1 Drawing Figure

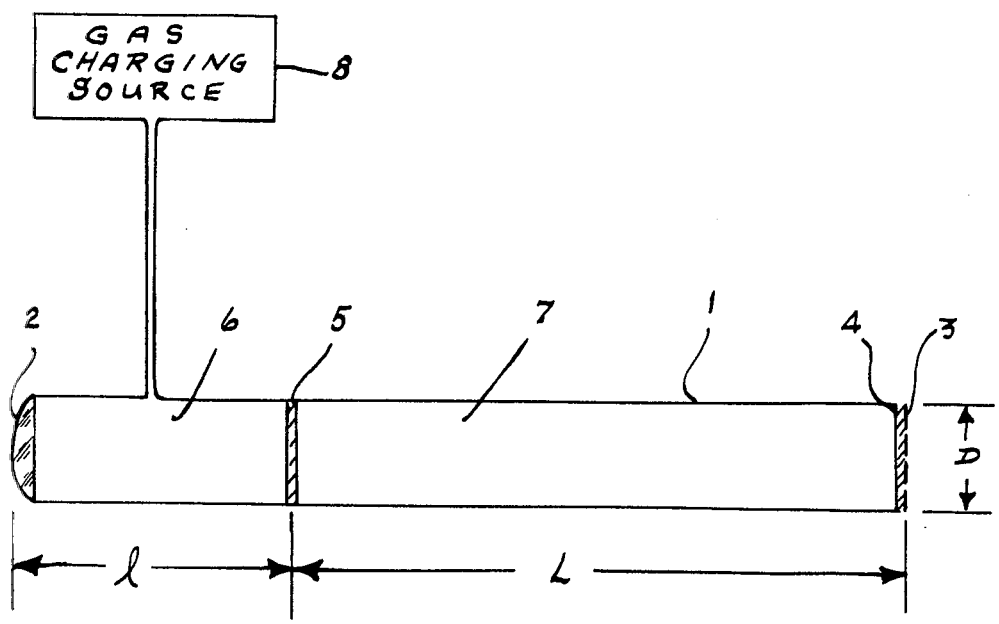

VERY HIGH POWER SHOCK WAVE GAS LASER

BACKGROUND OF THE INVENTION

A large class of lasers makes use of nonequilibrium processes in a gas discharge. At moderately low pressures (of the order of 1 torr) and fairly high currents, the population of energy levels is far from equilibrium distribution. Some levels are populated especially rapidly by the fast electrons in the discharge. Other levels empty particularly slowly and so accumulate large numbers of excited atoms. Thus, laser action can occur at many wavelengths in any of a large number of gases under suitable discharge conditions. For some gases, a continuous discharge, using either direct or radio frequency current gives laser action. Output powers of continuous gas lasers range from less than a microwatt up to about 1 watt.

Pulsed gas discharges permit a further departure from equilibrium. Thus, pulsed gas laser operation can be obtained in some additional gases. Peak output power has ranged up to about 100 watts and results in limited performance.

Many gas discharges produce only very small optical gain. Thus losses must be kept low. Mirrors with very high reflectivity consequently are used, and diffraction losses can be kept low by using spherical mirrors. One common arrangement, which combines relatively low diffraction losses and good mode selection, uses a flat mirror at one end and a spherical mirror at the other.

Gas lasers have been constructed with nearly ideal monochromaticity, wavelength stability, and narrowness of beam.

The single pulse laser of the present invention, in sharp contrast to the prior art, is capable of producing an extremely high power pulse output of 10.6 micron light energy in coherent form, focused at a distant target, of greater than 100 microsecond duration. The pulse contains sufficient energy to cause thermal damage to metal targets, such as aircraft and/or satellites. It is emphasized that this invention solves the problem of producing high energy pulses of coherent optical power without outside sources of electrical power.

SUMMARY OF THE INVENTION

A shock wave gas laser is provided. A circular steel tube is enclosed and sealed so as to be gas tight at one end by a spherical mirror and at the other end by a combination of a secondary diaphragm and a perforated plane mirror. The steel tube is separated by a frangible primary diaphragm to form a first and second chamber. The first chamber is charged to a high pressure with an appropriate gas until the primary diaphragm breaks. A shock wave is generated and travels down the second chamber which has disposed therein appropriate gases for providing stimulated emission and amplification. The secondary diaphragm is destroyed by the shock wave and output radiation is available by way of the perforated plane mirror.

DESCRIPTION OF THE DRAWING

The single FIGURE of the present invention shows a preferred embodiment of the shock wave gas laser.

DETAILED DESCRIPTION OF THE PREFERRED EMBODIMENT

Now referring in detail to the single FIGURE of the present invention, there is shown circular steel tube 1. Circular steel tube 1 is enclosed and hermetically sealed at one end by spherical mirror 2 and at the other end by a combination of plane mirror 3 and diaphragm 4. Plane mirror 3 is made of stainless steel and is perforated with a number of holes to allow for the output of radiation. The holes are initially sealed by plastic film secondary diaphragm 4. Circular steel tube 1 includes primary frangible diaphragm 5 which separates circular steel tube 1 into chambers 6 and 7, each of the chambers being hermetically sealed from the other and being individually gas tight. Gas charging source 8 is provided for charging chamber 6. The primary and secondary diaphragms are selected to rupture at a preselected pressure. They may both be plastic of a preselected thickness in accordance with the preselected pressure.

In the operation of the shock wave gas laser of the present invention, chamber 7, the driven section, is filled with a mixture of carbon dioxide, oxygen defluoride, and hydrogen at subatmosphere pressure. This mixture is one which may be conventionally used in and is capable of supporting a population inversion in gas lasers. Chamber 6, the driver, is charged to a high pressure with a light gas such as either hydrogen or helium until primary diaphragm 5 breaks. A shock wave is generated and travels down the length of the driven section. The shock wave heats the gas.

The pressures, in the driver and driven sections, are in the proper proportion to give a temperature behind the shock wave of the order of 1,500 degrees Kelvin. The oxygen difluoride dissociates giving fluorine atoms. The fluorine atoms combine with hydrogen producing hydrogen fluoride, much of which is in the first vibrationally excited state. The excited hydrogen fluoride couples with the (001) state of carbon dioxide producing an inverted population between (001) and (100) states of carbon dioxide. Stimulated emission and amplification at 10.6 microns are obtained by the confocal optical cavity comprised of mirrors 2 and 3. Again it is noted that plane mirror 3 is made of stainless steel and is perforated with a number of holes to allow for the output of radiation. The holes are initially sealed by plastic film secondary diaphragm 4 which is destroyed by the shock wave.

The gain may be controlled independently by adjusting the ratio of the length of the driven section to the length of the driver section, L/1. The output power and size of the output beam may be adjusted by changing the diameter of the tube, D.

Thus the present invention provides a single pulse laser weapon which produces a pulse of 10.6 micron light energy in coherent form, focused at a distant target, of greater than 100 microsecond duration. The pulse contains sufficient energy to cause thermal damage. The device uses shock tube and chemical kinetic principles to selectively pump the (001) vibrational state of carbon dioxide. Enclosing this system within a confocal optical cavity results in coherent optical output.

One of the novel features of this invention is the coaxial location of the optical cavity and the gun tube. This allows for the gain to be controlled by controlling the length of the driver section of the tube in proportion to the length of the driven section as well as independent control of the volume of the active medium by controlling the diameter of the tube.

What is claimed is:

1. A very high power shock wave laser comprising a tube of preselected length and diameter, said tube having first and second ends, a first reflecting mirror positioned at said first end and hermitically sealing said tube thereat, a second reflecting mirror perforated with holes and positioned at said second end, a first frangible diaphragm in combination with said second mirror to seal said holes, said combination serving initially to hermetically seal said tube at said second end, a second frangible diaphragm disposed in said tube and separating said tube into first and second chambers and also hermetically sealing said first chamber from said second chamber, said first and second frangible diaphragms being capable of rupturing at preselected pressures, a gaseous medium capable of supporting population inversion disposed in said second chamber, and means for charging said first chamber with a preselected light gas until rupture of said first frangible diaphragm permitting a generated shock wave and associated temperature to travel down said second chamber thus obtaining stimulated emission and amplification within the confocal optical cavity comprised of said first and second mirrors with output of radiation therefrom upon the rupture of said first diaphragm by said shock wave.

2. A very high power shock wave laser as described in claim 1 wherein said first reflecting mirror is spherical and said second reflecting mirror is plane.

3. A very high power shock wave laser as described in claim 1 including means to control the gain thereof by a preselected adjustment of the ratio of the length of said second chamber to the length of said first chamber.

4. A very high power shock tube as described in claim 1 wherein said gaseous medium consists of a mixture of carbon dioxide, oxygen difluoride, and hydrogen at subatmospheric pressure with said shock wave having temperatures associated therewith in the order of 1,500 degrees Kelvin so that the oxygen difluoride dissociates giving fluorine atoms, the fluorine atoms combining with hydrogen producing hydrogen fluoride vibrationally excited, the excited hydrogen fluoride coupling with carbon dioxide to produce an inverted population.

5. A very high power shock wave laser as described in claim 4 wherein said tube is comprised of steel in circular form.

6. A very high power shock wave laser as described in claim 5 wherein said light preselected gas is comprised of helium.

7. A very high power shock wave laser tube as described in claim 6 wherein said second mirror is comprised of stainless steel.

* * * * *